(12) United States Patent
Komitov et al.

(10) Patent No.: US 9,239,494 B2
(45) Date of Patent: Jan. 19, 2016

(54) POLYMER NETWORK STABILIZED FLEXOELECTRIC POLARIZATION

(76) Inventors: Lachezar Komitov, Göteborg (SE);
Gurumurthy Hegde, Kuantan (MY);
Seung Hee Lee, Göteborg (SE)

( * ) Notice: Subject to any disclaimer, the term of this patent is extended or adjusted under 35 U.S.C. 154(b) by 67 days.

(21) Appl. No.: 13/292,656

(22) Filed: Nov. 9, 2011

(65) Prior Publication Data

US 2013/0114008 A1    May 9, 2013

(51) Int. Cl.
| G02F 1/13 | (2006.01) |
| G02F 1/1337 | (2006.01) |
| G02F 1/1334 | (2006.01) |
| G02F 1/1343 | (2006.01) |
| G02F 1/137 | (2006.01) |

(52) U.S. Cl.
CPC *G02F 1/133753* (2013.01); *G02F 2001/13345* (2013.01); *G02F 2001/13775* (2013.01); *G02F 2001/133761* (2013.01); *G02F 2001/134372* (2013.01)

(58) Field of Classification Search
CPC ............................. G02F 1/13; G02F 1/1333
USPC ................. 349/33, 86–88, 123–126; 429/1.21–1.28
See application file for complete search history.

(56) References Cited

U.S. PATENT DOCUMENTS

| 2005/0057701 A1* | 3/2005 | Weiss ............................... 349/10 |
| 2006/0187402 A1* | 8/2006 | West et al. ...................... 349/183 |
| 2008/0204612 A1* | 8/2008 | Komitov ........................... 349/23 |
| 2008/0252769 A1* | 10/2008 | Verstegen et al. ............. 348/335 |
| 2010/0051194 A1* | 3/2010 | Chien et al. ................. 156/275.5 |
| 2010/0245723 A1 | 9/2010 | Chen et al. |
| 2010/0279125 A1* | 11/2010 | Buyuktanir et al. .......... 428/432 |
| 2013/0114008 A1* | 5/2013 | Komitov et al. ................ 349/33 |
| 2014/0132863 A1* | 5/2014 | Chang ............................. 349/15 |

FOREIGN PATENT DOCUMENTS

WO    WO 2005/072460 A2    8/2005

* cited by examiner

*Primary Examiner* — Kaveh Kianni
(74) *Attorney, Agent, or Firm* — Buchanan Ingersoll & Rooney P.C.

(57) ABSTRACT

A liquid crystal device comprising a first substrate; a second substrate; and a liquid crystal layer sandwiched between the first substrate and the second substrate, the liquid crystal layer comprising a nematic liquid crystal material and a polymer network. The polymer network is anchored to said first substrate and is configured to alternatingly induce splay deformation and bend deformation of the nematic liquid crystal material along a line parallel with the first substrate. Hereby, the relaxation time $\tau_{fall}$ of the liquid crystal device is reduced.

10 Claims, 5 Drawing Sheets

POLYMER NETWORK STABILIZED FLEXOELECTRIC POLARIZATION

FIELD OF THE INVENTION

The present invention relates to a liquid crystal device comprising a polymer network. The present invention further relates to a method of manufacturing such a liquid crystal device.

BACKGROUND OF THE INVENTION

Important characteristics of the electro-optic response of conventional nematic liquid crystal devices and displays are the switching rise $\tau_{rise}$ and fall $\tau_{fall}$ times, which usually are in the range of a couple of milliseconds. It is well known that $\tau_{rise}$ can effectively be controlled by the applied electric field whereas $\tau_{fall}$ cannot. In many device applications of the liquid crystals, such as 3D LCDs for instance, fast switching of the liquid crystal device with both $\tau_{rise}$ and $\tau_{fall}$ being preferably in the microsecond region, is required. To achieve such a fast switching in nematic liquid crystal devices and displays is however a difficult and very complicated task especially what concerns $\tau_{fall}$.

As known, $\tau_{fall}$ depends strongly on the liquid crystal material properties, elastic constants and viscosity. It depends also on the characteristics of the sandwich cell containing the liquid crystal, cell gap d and anchoring strength W. In the presence of strong anchoring condition, $\tau_{fall}$ is proportional to the square of the cell gap, i.e. $d^2$, whereas if the anchoring condition is weak then $\tau_{fall}$ is proportional to d and 1/W. To decrease the cell gap is obviously a possible way of reducing $\tau_{fall}$. Such an approach, however, is not easy to employ due to the limitations of the LCD technology.

Another possible way of reducing $\tau_{fall}$ is to increase the contact area between the liquid crystal and the solid surface. One known way of achieving this is to create a polymer network within the liquid crystal bulk. Thus, the effect of the restoring force of the liquid crystal/solid surface interactions on the relaxation process, taking place in the liquid crystal after turning off the applied electric field, is substantially magnified resulting in reduction of $\tau_{fall}$.

This approach is described in US 2010/0245723, which discloses a liquid crystal device of the twisted nematic type where a polymer network is disposed among the liquid crystal molecules of the liquid crystal layer. The polymer network is arranged to bias the liquid crystal molecules towards an untwisted state.

This will reduce the relaxation time (from the twisted state to the untwisted state), which is expected to result in a reduction of the total response time ($\tau_{rise}+\tau_{fall}$) of the liquid crystal device according to US 2010/0245723.

However, the polymer network in the liquid crystal device according to US 2010/0245723 will at the same time increase the rotation time (the time to transition the liquid crystal material from the untwisted state to the twisted state). Furthermore, it is likely that the introduction of the polymer network will result in an increase in the threshold voltage for switching as compared to the case without the polymer network. Further undesirable effects that may be introduced through the provision of a polymer network such as that in the liquid crystal device according to US 2010/0245723 include light scattering and residual birefringence, which may detrimentally influence the optical performance of the liquid crystal device.

SUMMARY OF THE INVENTION

It is an object of the present invention to address the above problems of the prior art, and to provide an improved liquid crystal device being configured to enable a short rise time (when an electric field is applied) and a short fall time (time for relaxation to the initial Field OFF state when the electric field is removed). In particular, it would be desirable to achieve this with a reduced occurrence of unwanted side effects, such as the above-mentioned increased threshold voltage, light scattering and residual birefringence.

According to a first aspect of the present invention, it is therefore provided a liquid crystal device comprising a first substrate; a second substrate; and a liquid crystal layer sandwiched between the first substrate and the second substrate, the liquid crystal layer comprising a nematic liquid crystal material and a polymer network; wherein the polymer network is anchored to the first substrate and is configured to alternatingly induce splay deformation and bend deformation of the nematic liquid crystal material along a line parallel with the first substrate.

That the polymer network is "anchored to the first substrate" should be understood to mean that there are bonds between the polymer network and the surface of the first substrate facing the liquid crystal layer.

The present invention is based on the realization that the presence of a flexoelectric polarization in the liquid crystal material in the "Field OFF" state (in which no switching electric field exists in the liquid crystal device) reduces the relaxation time $\tau_{fall}$ of the liquid crystal device. The theory behind this will be explained further below, under the heading "Theoretical Explanation". The present inventors have further realized that such a flexoelectric polarization in the Field OFF state, i.e. in the absence of an electric field in the liquid crystal layer, can be achieved by providing a polymer network that is anchored to one of the substrates of the liquid crystal device and is configured to alternatingly induce splay deformation and bend deformation of the nematic liquid crystal material along a line parallel with the first substrate.

The present inventors have found that the above-mentioned reduced relaxation time $\tau_{fall}$ of the liquid crystal device is achievable with a polymer network that is configured to alternatingly induce splay deformation and bend deformation of the nematic liquid crystal material in a thin region adjacent to the first substrate. In particular, the region in which the splay and bend deformation is induced may be thinner than a distance corresponding to the wavelength of visible light. Accordingly, the reduced relaxation time is achievable substantially without introducing any optical disturbances, such as the light scattering and/or residual birefringence mentioned in the Background section.

Furthermore, the present inventors have surprisingly found that the polymer network in the liquid crystal device according to various embodiments of the present invention reduces the relaxation time $\tau_{fall}$ of the liquid crystal device substantially without any increase in the switching time $\tau_{rise}$ of the liquid crystal device. Based on previous experience, such an increase in the switching time $\tau_{rise}$ of the liquid crystal device was to be expected, but since the alternatingly induced splay and bend deformation also involves a small pretilt of the liquid crystal molecules adjacent to the first substrate, the effects of the decreased mobility of the liquid crystal molecules due to the polymer network are substantially cancelled (or even outweighed) by the improved switching performance due to the pretilt.

One advantageous way of achieving the polymer network that is anchored to the first substrate and is configured to alternatingly induce splay deformation and bend deformation of the nematic liquid crystal material along a line parallel with the first substrate is to subject a mixture of nematic liquid crystal material and photo-polymerizable pre-polymer to an electric field that is alternatingly substantially vertical to the first substrate and substantially parallel to the first substrate, and then provide light for polymerizing the photo-polymerizable pre-polymer while the electric field is applied so that a polymer network that has been influenced by the configuration of the nematic liquid crystal material under the influence of the electric field is formed. This is explained further below with reference to an embodiment of the method according to the second aspect of the present invention.

Such a spatially alternating electric field may be applied in the manufacturing process using electrodes that are external to the liquid crystal device.

However, according to various embodiments, the liquid crystal device of the present invention may further comprise first and second individually controllable electrodes arranged and configured such that application of a voltage between the first and second electrodes results in an electric field inside the liquid crystal layer, the electric field alternatingly being substantially vertical to the first substrate and substantially parallel to the first substrate along a line parallel with the first substrate.

By including the first and second individually controllable electrodes in the liquid crystal device, it may be easier to form a suitable electric field that is strongly localized to the first substrate. Furthermore, the same electrodes may be used for controlling the switching of the finished liquid crystal device.

The first and second individually controllable electrodes may be arranged in a layered configuration on the first substrate with an insulating layer arranged between the first and second individually controllable electrodes, the insulating layer being arranged to prevent an electrically conductive connection between the first and second individually controllable electrodes, and being arranged to physically separate the first and second individually controllable electrodes in a direction perpendicular to the first substrate.

The second individually controllable electrode may be arranged between the first individually controllable electrode and the liquid crystal layer, and the second individually controllable electrode may be arranged to alternatingly shield and expose the first individually controllable electrode.

This type of electrode configuration is generally referred to as a "fringe field switching" or FFS configuration, and is suitable for forming a highly localized and spatially alternating electric field.

Alternatively, the first and second individually controllable electrodes may be arranged in the same plane to form a so-called "in-plane switching" or IPS configuration.

Both the FFS-configuration and the IPS-configuration are well-known to the skilled person and are widely used for switching various liquid crystal devices.

According to various embodiments of the liquid crystal device of the present invention, the polymer network may advantageously be configured to alternatingly induce the splay deformation and the bend deformation of the nematic liquid crystal material only within 1 µm from a surface of the first substrate facing the liquid crystal layer. Within the 1 µm from the surface, the magnitude of the induced splay and bend deformation may decrease gradually with distance from the surface.

Hereby, the optical influence of the variation in orientation of the liquid crystal molecules in the Field OFF state can be kept to a minimum. To further reduce or even eliminate the optical influence of the variation in orientation, the polymer network may be configured to alternatingly induce the splay deformation and the bend deformation of the nematic liquid crystal material only within about 0.4 µm from a surface of the first substrate facing the liquid crystal layer, so that visible light will not be influenced by the localized distortion of the nematic liquid crystal material adjacent to the first substrate.

According to various embodiments, the first substrate may comprise an alignment layer facing the liquid crystal layer, the alignment layer promoting a substantially homeotropic alignment, i.e. a configuration where the liquid crystal molecules adjacent to the alignment layer are substantially perpendicular to the first substrate in the absence of an electric field.

Moreover, the second substrate may also comprise an alignment layer facing said liquid crystal layer, the alignment layer promoting a substantially homeotropic alignment.

Moreover, the liquid crystal material may have either positive dielectric anisotropy or negative dielectric anisotropy.

According to various embodiments of the liquid crystal device of the present invention, the nematic liquid crystal material may advantageously have such flexoelectric coefficients that the splay deformation of the nematic liquid crystal material results in a first flexoelectric polarization component perpendicular to the first substrate and the bend deformation of the nematic liquid crystal material results in a second flexoelectric polarization component having the same direction as the first flexoelectric polarization component.

Through the selection of a nematic liquid crystal having the above properties, the total flexoelectric polarization (which is the vector sum of the flexoelectric polarization due to splay deformation and the flexoelectric polarization due to bend deformation) will be higher, which will result in a further reduction of the relaxation time $\tau_{fall}$ of the liquid crystal device. This will be explained further below under the heading "Theoretical Explanation" for an exemplary case.

Various embodiments of the liquid crystal device according to the present invention may further comprise a polymer network anchored to the second substrate and being configured to alternatingly induce splay deformation and bend deformation of the nematic liquid crystal material along a line parallel with the second substrate.

Moreover, the liquid crystal device may further comprise third and fourth individually controllable electrodes arranged on the second substrate and configured such that application of a voltage between the third and fourth electrodes results in an electric field inside the liquid crystal layer, the electric field alternatingly being substantially vertical to the second substrate and substantially parallel to the second substrate along a line parallel with the second substrate.

According to a second aspect of the present invention, there is provided a method of manufacturing a liquid crystal device, comprising the steps of providing a liquid crystal device having a liquid crystal layer sandwiched between a first substrate and a second substrate, the liquid crystal layer comprising a nematic liquid crystal material and photo-polymerizable pre-polymer; and photo-polymerizing the photo-polymerizable pre-polymer in such a way that a polymer network is formed, the polymer network being anchored to the first substrate and configured to alternatingly induce splay deformation and bend deformation of the nematic liquid crystal material along a line parallel with the first substrate.

By the term "photo-polymerizable pre-polymer" should be understood any substance from which a polymer is formed upon irradiation with light. Examples of photo-polymerizable pre-polymers include monomers, or any suitable parts of a polymer, such as dimers.

According to one embodiment, the step of photo-polymerizing the photo-polymerizable pre-polymer may comprise the steps of forming an inhomogeneous electric field inside the liquid crystal layer, the electric field alternatingly being substantially vertical to the first substrate and substantially parallel to the first substrate along a line parallel with the first substrate; and illuminating the liquid crystal device with light for polymerizing the photo-polymerizable pre-polymer adjacent to the first substrate while maintaining the electric field.

Advantageously, the inhomogeneous electric field may be localized to the first substrate such that any electric field inside the liquid crystal layer further away than 1 µm from the first substrate, in a direction perpendicular to the first substrate, is substantially homogeneous.

Hereby, a polymer network is formed which induces alternating splay and bend deformation in the absence of an electric field only within a thin region in the vicinity of the first substrate.

According to another embodiment, the step of photo-polymerizing the photo-polymerizable pre-polymer may comprise the step of illuminating the liquid crystal device with light through a mask comprising a first plurality of portions having an optical transmittance below a first threshold value and a second plurality of portions having an optical transmittance above a second threshold value being greater than the first threshold value, the first plurality of portions and the second plurality of portions being alternatingly arranged.

The first plurality of portions and the second plurality of portions may, for example, be arranged in a striped configuration or in a checker-board configuration. Moreover, the mask may advantageously be a so-called gray scale mask, such that there is a gradual transition in optical transmittance between a portion of the first plurality of portions and a portion of the second plurality of portions arranged adjacent to each other.

According to various embodiments of the method according to the present invention, the light used for illuminating the liquid crystal device may have optical properties selected to only polymerize the photo-polymerizable pre-polymer within 1 µm from the first substrate, in a direction perpendicular to the first substrate.

Embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF PREFERRED EMBODIMENTS

In the following detailed description, embodiments of the present invention are mainly described with reference to a single cell liquid crystal device. It should, however, be noted that the description provided herein is equally applicable to a liquid crystal device comprising a plurality of individually controllable cells, such as a liquid crystal panel for use in, for example, a display apparatus, such as a television device. Such a liquid crystal device comprising a plurality of cells is naturally also within the scope of the claims.

Furthermore, the liquid crystal cell described below is a single sided liquid crystal cell with control electrodes comprised only in the first substrate and a polymer network being anchored at the first substrate and being configured to influence the nematic liquid crystal material in the Field OFF state in the vicinity of the first substrate. It should be noted that the present invention by no means is limited to such a single sided liquid crystal cell, but applies equally well to a double sided liquid crystal cell having control electrodes and/or a polymer network at both substrates.

Figure 1:
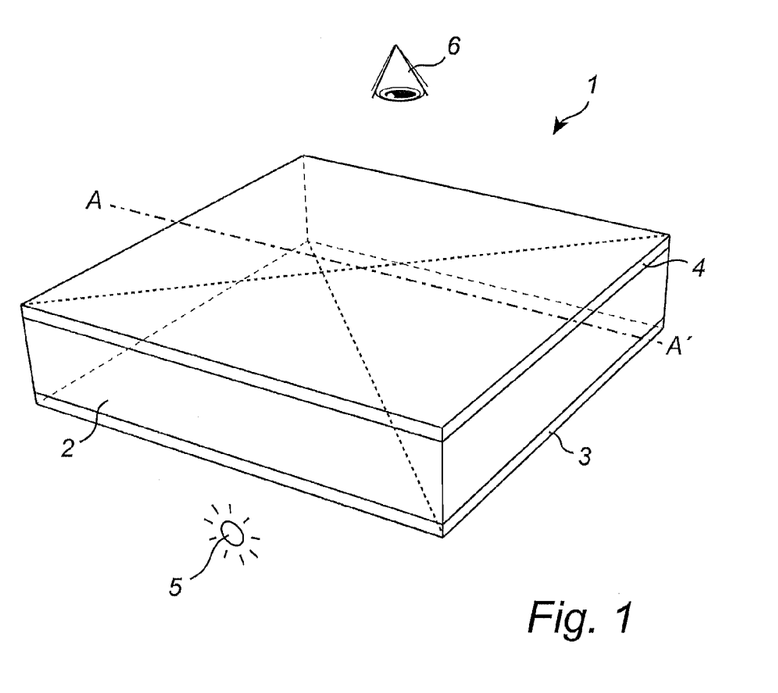
FIG. 1 is a schematic perspective view of a liquid crystal device according to various embodiments of the present invention.

FIG. 1 is a schematic perspective view of a liquid crystal device 1 according to various embodiments of the present invention. The liquid crystal device 1 comprises a liquid crystal cell 2 arranged between crossed polarizer plates 3, 4—a "polarizer" 3 closest to the light-source 5, and an "analyzer" 4 closest to the viewer 6. The respective polarization directions of the polarizer 3 and the analyzer 4 are indicated by the dashed lines in FIG. 1.

In operation, the liquid crystal device 1 is switched back and forth between a bright state and a dark state through modulation of the voltage applied between control electrodes comprised in (not shown in FIG. 1) the liquid crystal device 1. In the bright state, the liquid crystal device 1 modifies the light that has passed through the polarizer 3 so that light can pass through also the analyzer 4, and in the dark state, the light that has passed through the polarizer 3 will not be able to pass through the analyzer 4.

Figure 2:
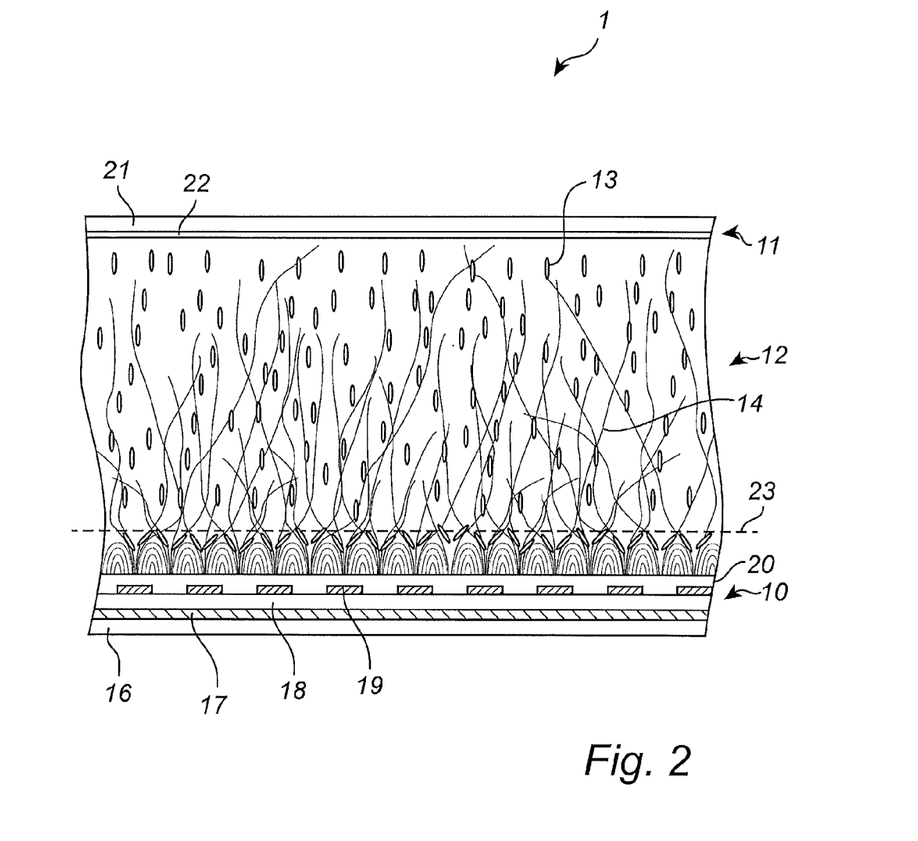
FIG. 2 is a cross-section view of a liquid crystal cell comprised in the liquid crystal device in FIG. 1.

As can be seen in FIG. 2, which is a schematic cross-section view of the liquid crystal cell 2 in FIG. 1 with the section made along the line A-A', the liquid crystal cell 2 comprises a first substrate 10, a second substrate 11, and a liquid layer 12 sandwiched between the first substrate 10 and the second substrate 11.

The liquid crystal layer 12 comprises a nematic liquid crystal material 13 and a polymer network 14 The nematic liquid crystal material 13 is generally indicated by a few schematic liquid crystal molecules, and the polymer network 14 by some polymer strands. The liquid crystal molecules of the liquid crystal material 13 and the cell gap (the distance between the first substrate 10 and the second substrate 11) are not drawn to scale, and the polymer strands of the polymer network 14 may have many different configurations, which may vary from liquid crystal cell to liquid crystal cell.

The first substrate 10 comprises, from bottom to top as indicated in FIG. 2, a transparent carrier 16, a first electrode 17, an insulating layer 18, a second electrode 19 and an alignment layer 20 promoting vertical alignment, so-called homeotropic alignment, of the liquid crystal molecules adjacent to the alignment layer.

The second substrate 11 comprises, from top to bottom, as indicated in FIG. 2, a transparent carrier 21, and an alignment layer 22 promoting vertical alignment, so-called homeotropic alignment, of the liquid crystal molecules adjacent to the alignment layer.

The first 17 and second 19 electrodes of the first substrate 10 may advantageously be made of a transparent conductive material, such as ITO (Indium Tin Oxide), IZO (Indium Zinc Oxide) or Aluminum doped ZnO, or may alternatively be made of a metal layer that is sufficiently thin to allow passage of light through the metal layer. The insulating layer 18 is made of a suitable transparent insulator, such as an oxide, a nitride or a polymer layer. Examples of suitable insulator materials include, for example, silicon oxide, silicon nitride and various spin-on dielectrics.

As can be seen in FIG. 2, the insulating layer 18 is arranged to separate the first electrode 17 and the second electrode 19 physically as well as electrically, to achieve a so-called fringe-field switching (FFS) arrangement. To that end, the first electrode 17 and the second electrode 19 are arranged in different planes, and, from the view point of the liquid crystal layer, the second electrode 19 is configured to alternatingly (spatially) shield the first electrode 17 and expose the first electrode 17.

Since both the alignment layer 20 of the first substrate 10 and the alignment layer 22 of the second substrate 11 promote vertical alignment, the liquid crystal material 13 will be substantially homeotropically/vertically aligned in the absence of an electric field (when no voltage is applied between the first electrode 17 and the second electrode 19). As will be explained further below, this Field OFF-state will be a dark state when the liquid crystal cell 2 is arranged between crossed polarizers as indicated in FIG. 1.

When a voltage is applied between the first electrode 17 and the second electrode 19, the electric field will couple with the liquid crystal molecules and cause those liquid crystal molecules that experience a sufficiently large electric field to reorient. This will result in a shift in the phase retardation of the liquid crystal cell 2, which will in turn result in transmission of light through the liquid crystal device 1 in FIG. 1.

Although the mechanism behind this switching from a dark Field OFF state to a bright Field On state is well known to the skilled person, a brief theoretical explanation is provided below.

A nematic liquid crystal cell with uniform alignment behaves optically as a uniaxial (birefringent) optical plate with its optic axis coinciding with the preferred direction of orientation of the liquid crystal molecules in the cell. Inserted between two crossed polarizers, the intensity of the light 1 transmitted through the cell and the polarizers, when the cell is oriented with its optic axis at 45° to the polarizer transmission direction, is given simply by:

$$l = l_0 \sin^2 \delta/2,$$

where $\delta = 2\pi d \Delta n/\lambda$ represents the phase retardation of the cell due to its birefringence $\Delta n = n_e - n_o$ ($n_e$ and $n_o$ are extraordinary and ordinary refractive index of the liquid crystal material, respectively), and $\lambda$ is the wavelength of the light. When the nematical liquid crystal molecules are all substantially vertically aligned, the birefringence $\Delta n$ of the liquid crystal cell 2 will be substantially zero, which means that the transmitted intensity will also be substantially zero. When liquid crystal molecules are reoriented, the birefringence $\Delta n$ will become non-zero, and the liquid crystal device 1 will transmit light.

As mentioned above, the liquid crystal cell 2 in FIG. 2 comprises a polymer network 14. This polymer network 14 is anchored to the first substrate 10 and is configured to alternatingly induce splay deformation and bend deformation of the nematic liquid crystal material 13 along a line parallel with the first substrate 10.

Through the splay and bend deformation of the liquid crystal material 13 induced by the polymer network 14, a flexoelectric polarization is induced in the Field OFF state. Due to the presence of a flexoelectric polarization in the Field OFF state, the relaxation time $\tau_{fall}$ of the liquid crystal cell 2 is reduced as compared to the case without the polymer network 14. The theory behind this relationship between the flexoelectric polarization and the relaxation time $\tau_{fall}$ will be explained further below under the heading "Theoretical Explanation".

In addition to resulting in a reduced relaxation time $\tau_{fall}$, the above-described configuration of the polymer network 14 does not result in a significantly increased switching time $\tau_{rise}$ or threshold voltage for switching as compared to the case without a polymer network. In fact, the switching time $\tau_{rise}$ and threshold voltage for switching may even be lower than for a corresponding liquid crystal cell without a polymer network. The reason for this is that the polymer network also introduces a small pretilt adjacent to the first substrate 10, which allows for faster switching and a reduced threshold voltage.

Advantageously, the polymer network 14 may be configured to only induce the above-mentioned splay and bend deformation of the nematic liquid crystal material 13 within a sub-region close to the first substrate, as is schematically indicated by the sub-region defined by the surface of the first substrate 10 and the dashed line 23 in FIG. 2.

The distance between the surface of the first substrate 10 and the dashed line may advantageously be less than 1 µm, in which case the optical influence/disturbance caused by the splay and bend deformation will, in most cases, be negligible. If the polymer network 14 is configured such that the splay and bend deformation of the nematic liquid crystal material 13 is substantially confined within a sub-region that extends a distance smaller than the wavelength of visible light (about 0.4 µm), there will be no detrimental influence by the splay and bend deformation on the optical properties of the liquid crystal cell 2.

An exemplary method of manufacturing the liquid crystal cell 2 in FIG. 2 will now be described with reference to FIG. 3 and FIGS. 4a-d.

Figure 4A:
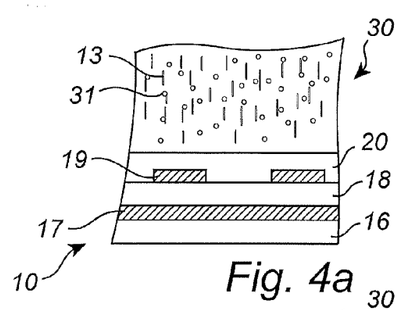
FIGS. 4a-d are cross-section views, each schematically illustrating the state of the liquid crystal cell following the associated method step in FIG. 3.

In a first step 101, a liquid crystal cell 30 (partly shown in FIGS. 4a-d) with a liquid crystal layer comprising a mixture of a photo-polymerizable pre-polymer 31, schematically indicated by round rings in FIG. 4a, and a nematic liquid crystal material 13 sandwiched between first 10 and second substrates (The second substrate is not shown in the partial cross-section of FIGS. 4a-d). The substrates are configured in the same way as was described above with reference to FIG. 2. The liquid crystal layer may further comprise a photoinitiator etc, and the photo-polymerizable pre-polymer 31 may be provided in the form of a monomer, or any suitable part of a polymer, such as a dimer.

Figure 4B:
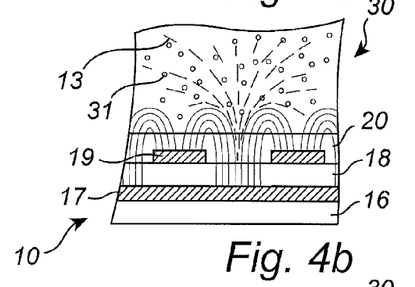
Figure 4C:
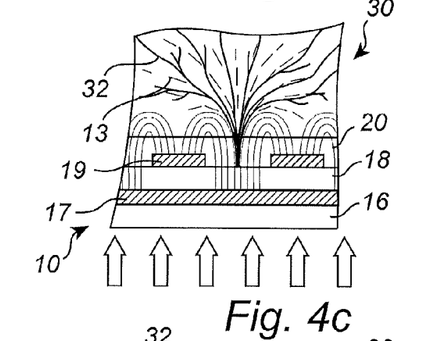
Figure 4D:
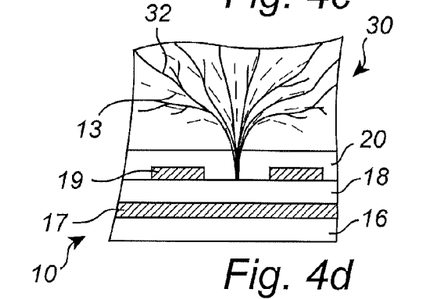

In the second step 102, an inhomogeneous electric field is provided inside the liquid crystal layer as is schematically indicated in FIG. 4b by applying a voltage between the first 17 and second 19 electrodes as was described above with reference to FIG. 2.

As can be seen in FIG. 4b, the electric field is alternatingly substantially vertical to the first substrate and substantially parallel to the first substrate along a line parallel with the first substrate. As is also schematically indicated in FIG. 4b, the liquid crystal molecules of the nematic liquid crystal material 13 will tend to align to the electric field lines, which will cause a substantially corresponding ordering of the photo-polymerizable pre-polymer 31.

The voltage applied between the first 17 and second 19 electrodes may advantageously be selected such that the electric field is strongly localized adjacent to the first substrate 10. For example, the voltage may be selected such that there is only a substantial redirection of the liquid crystal molecules within about 1 µm from the surface of the first substrate 10.

Figure 3:
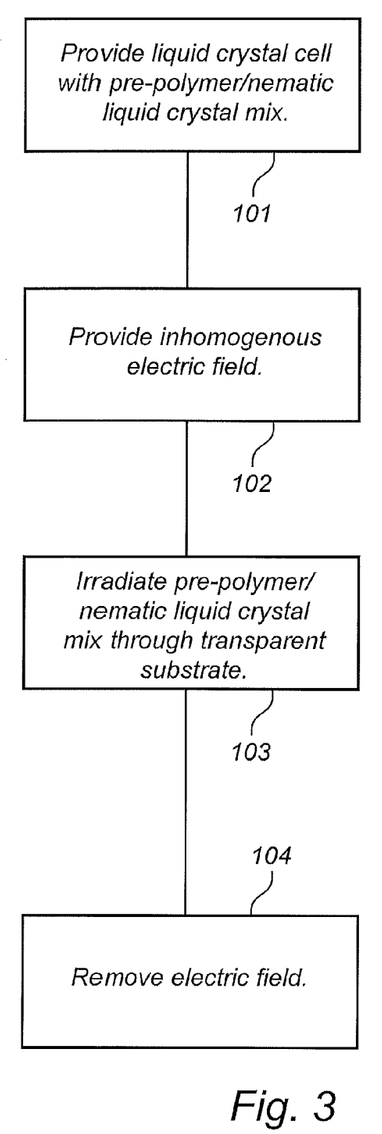
FIG. 3 is a flow-chart of an exemplary method of manufacturing the liquid crystal cell in FIG. 2.

Subsequently, in step 103, the liquid crystal layer is irradiated with light being transmitted through the transparent first substrate 10 to form a polymer network. Since, as was mentioned above, the distribution of the photo-polymerizable pre-polymer 31 is influenced by the field-induced redirection of the liquid crystal molecules, the configuration of the polymer network formed through the irradiation will also be influenced by the field-induced redirection of the liquid crystal molecules.

The properties of the light are advantageously selected such that the photo-polymerizable pre-polymers polymerize mainly in the vicinity of the first substrate 10. The extension of the polymerization from the first substrate 10 can be controlled through suitable selection of the wavelength and the intensity of the light. In particular, light in the ultraviolet range may advantageously be selected at a wavelength where the liquid crystal material 13 absorbs light. This means that the ultraviolet light intensity will typically decrease exponentially with the distance that the light has traveled inside the liquid crystal layer. Optimal irradiation parameters will vary depending on the types of photo-polymerizable pre-polymer and nematic liquid crystal material used, but given known material properties, it will be straight-forward for those skilled in the art to determine suitable irradiation properties. More about photo-polymerization is also explained in patent application Ser. No. 10/766,273, which is hereby incorporated by reference in its entirety.

In the final step 104, the electric field is removed, which means that there is no longer any force due to the electric field acting on the liquid crystal molecules. However, the orientations of the liquid crystal molecules closest to the first substrate will be influenced by the polymer network 32 that was formed in the preceding step 103. In particular, the polymer network 32 will alternatingly induce splay deformation and bend deformation of the nematic liquid crystal material 13 along a line parallel with the first substrate.

It should be noted that the figures are simplified and schematic illustrations that are provided to explain various aspects of the present invention, and that the proportions are not representative to a real situation.

Moreover, those skilled in the art will be able to select further suitable liquid crystal materials, cell dimensions, alignment layers, more complex driving schemes, etc without undue burden.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Theoretical Explanation

Let us consider, for simplicity, the general case of a nematic liquid crystal layer of thickness d and with vertical alignment (VA) in the field off state, which elastic splay/bend deformation under an applied electric field is in the xz plane with z=0 at d/2, i.e. z is varying ±d/2. In one elastic constant approximation, the elastic free energy $f_{elastic}$ of the liquid crystal layer is given by:

$$f_{elastic} = \frac{1}{2} \int_{-d/2}^{d/2} K\left(\frac{\partial \phi}{\partial z}\right)^2 dz,$$

where
K is the elastic constant, $\phi$ is the angle formed by the director and the z-axis. If the nematic liquid crystal possesses flexoelectric properties, the elastic deformation in the xz plane, frozen by the polymeric network and anchored to the substrate surface, at E=0 gives rise to a flexoelectric polarization $P_{flexo}$ with only component along z-axis described by $$P_z = e_{11} \bar{n} \text{div} \bar{n} - e_{33} \bar{n} \times \text{rot} \bar{n}, \text{ where}$$

$e_{11}$ and $e_{33}$ are the flexoelectric coefficient for splay and bend deformation, respectively. In this case the dielectric displacement in the sample in the presence of $P_{flexo}$ reads $$D_z = \epsilon_{zz} E_z + P_z, \text{ where}$$

$\epsilon_{zz}$ is the component of dielectric constant along z-axis given by $$\epsilon_{zz} = \epsilon_\perp \sin^2 \phi + \epsilon_\parallel \cos^2 \phi, \text{??and}$$

$E_z$ is the only component of the electric field due to the flexoelectric polarization $P_{flexo}$ which is different from zero.

By assuming that the liquid crystal is insulating medium, i.e. without free charges, then $D_z$ is zero. Hence, $$E_z = -\frac{P_z}{\varepsilon_{zz}},$$

where
the electrostatic energy due to the flexoelectric polarization, i.e. due to the field $E_z$, is given by $$f_{flexo} = \frac{1}{2} \int_{-d/2}^{d/2} \frac{P_z^2}{\varepsilon_{zz}} dz,$$

with
$P_z$ given by:

$$P_z = -\frac{e}{2} \sin(2\phi)\left(\frac{\partial \phi}{\partial z}\right),$$

with $e = e_{11} + e_{33}$

Inserting $P_z$ we obtain $$f_{flexo} = \frac{1}{2} \int_{-d/2}^{d/2} \frac{e^2 \sin^2(2\phi)}{4\varepsilon_{zz}(\phi)}\left(\frac{d\phi}{dz}\right)^2 dz$$

The total free energy will be then $$f = f_{elastic} + f_{flexo}, \text{ or}$$

$$f_{total} = \frac{1}{2} \int_{-d/2}^{d/2} \left(K + \frac{e^2 \sin^2(2\phi)}{4\varepsilon_{zz}(\phi)}\right)\left(\frac{d\phi}{dz}\right)^2 dz, \text{ which gives}$$

$$f_{total} = \frac{1}{2} \int_{-d/2}^{d/2} \tilde{K}\left(\frac{d\phi}{dz}\right)^2 dz, \text{ where}$$

$$\overline{K} = K + \frac{e^2 \sin^2(2\phi)}{4\varepsilon_{zz}(\phi)}$$

$\overline{K}$ is the renormalized elastic constant in presence of $P_{flexo}$ which is larger than the elastic constant $K$ in absence of such a polarization, i.e. $\overline{K} > K$. The relaxation response time or so-called fall time $\tau_{fall}$ after turning off the applied electric field, is given by $$\tau_{fall} \propto \eta d^2 / K$$

When $P_{flexo}$ is present then $$\tau_{fall}^{flexo} \propto \eta d^2 / \overline{K}$$

Since $K < \overline{K}$ then $$\tau_{fall}^{flexo} < \tau_{fall}$$

Hence, the flexoelectric polarization, due to the polymeric network which holds the elastic deformation of the liquid crystal after turning off the applied electric field, makes the relaxation (fall) time of the nematic liquid crystal faster.

Experiment

In one exemplary experiment (references to FIGS. 4a-d), the liquid crystal cell 30 contained the nematic liquid crystal mixture ZLI4792 (Δ∈>0) by Merck in which was dissolved the photoreactive liquid crystal monomer 31 RM257 by Merck and photoinitiator Irgacure 784 in ratio 80/19/1% wt, respectively. The inner surfaces of the glass substrates 16, 21 of the liquid crystal cell 30 were covered with alignment layers 20, 22 in the form of polyimide SE-1211 from Nissan Chemical for promoting homeotropic alignment of the liquid crystal molecules 13, i.e. with preferred direction of orientation perpendicular to the substrates 10, 11. The cell gap was uniform and about 3 μm. For photo polymerization of the photoreactive monomer and thus creating a polymer network 14 in the liquid crystal layer, the liquid crystal cell 30 was illuminated by an unpolarized light source obtained from OSRAM, Ultra-Vitalux, Germany, supplying light with broad wavelength spectrum.

Before shining the liquid crystal cell 30 with the unpolarized light, a voltage was applied between the first 17 and the second 19 electrodes of the liquid crystal cell 30 in order to generate a fringe electric field as is schematically indicated in FIG. 4b. The magnitude of the applied voltage is chosen to be very low so that the fringe field is substantially localized at the surface of the first substrate 10, i.e. it is penetrating very little in the bulk of the liquid crystal layer. As a result, the applied fringe electric field causes periodic distortions of the homeotropic alignment of the liquid crystal only nearby the electrode surface. After applying such a low voltage, the liquid crystal cell 30 was illuminated with unpolarized light for 40 min in order to create a polymer network in the liquid crystal bulk by means of photo-polymerization of the photoreactive liquid crystal monomer RM257 dissolved in the liquid crystal. The applied voltage was kept constant during the illumination. The fibers of the polymer network follow to a large extent the alignment of the liquid crystal molecules in the liquid crystal layer under the application of the fringe field.

The optical appearance of the finished liquid crystal cell 30 placed in between two crossed polarizers after illumination with unpolarized light has been found to be the same as the one before illumination. No undesirable light scattering effects due to the presence of the polymer network 14 in the liquid crystal bulk were found. It should also be noted that the periodic distortions of the liquid crystal molecules orientation near the electrode surface, preserved by the polymer network, have been found not to have any negative impact on the optical characteristics of the device since they are localized at the electrode surface in a very thin layer with thickness shorter than the wavelength of the incoming light and thus being optically invisible.

Figure 5A:
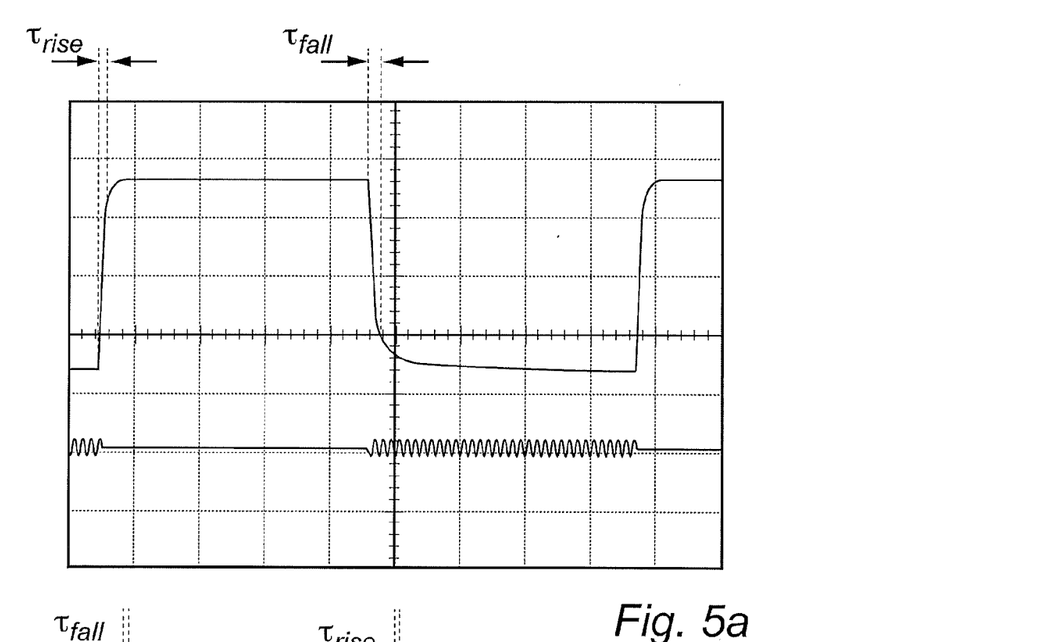
FIGS. 5a-b are plots of the optical response of the liquid crystal cell before and after photo-polymerization, respectively.
Figure 5B:
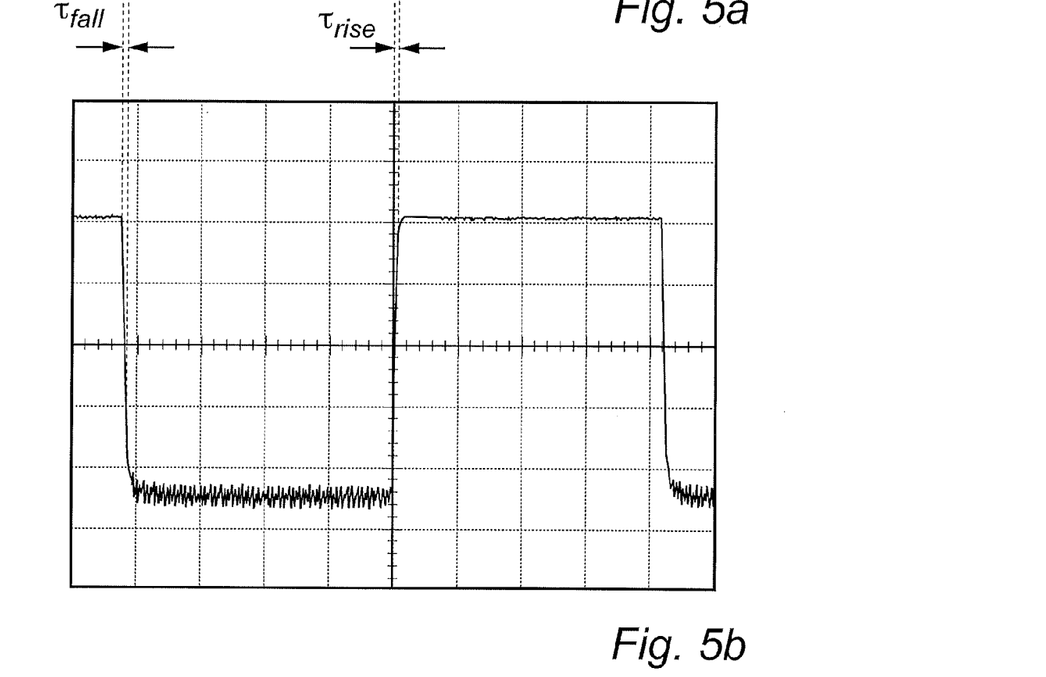

Plots showing the optical response of the liquid crystal cell 30 before and after the photopolymerzation of the photoreactive monomer are provided in FIGS. 5a and 5b, respectively. It was found that the switching time $\tau_{rise}$ and the relaxation time $\tau_{fall}$ of the liquid crystal cell 30 before illumination were about several milliseconds whereas after illumination of the device for 40 min with unpolarized light, the response times, $\tau_{rise}$ and $\tau_{fall}$, became one order of magnitude shorter, i.e. about hundred μs.

Figure 6:
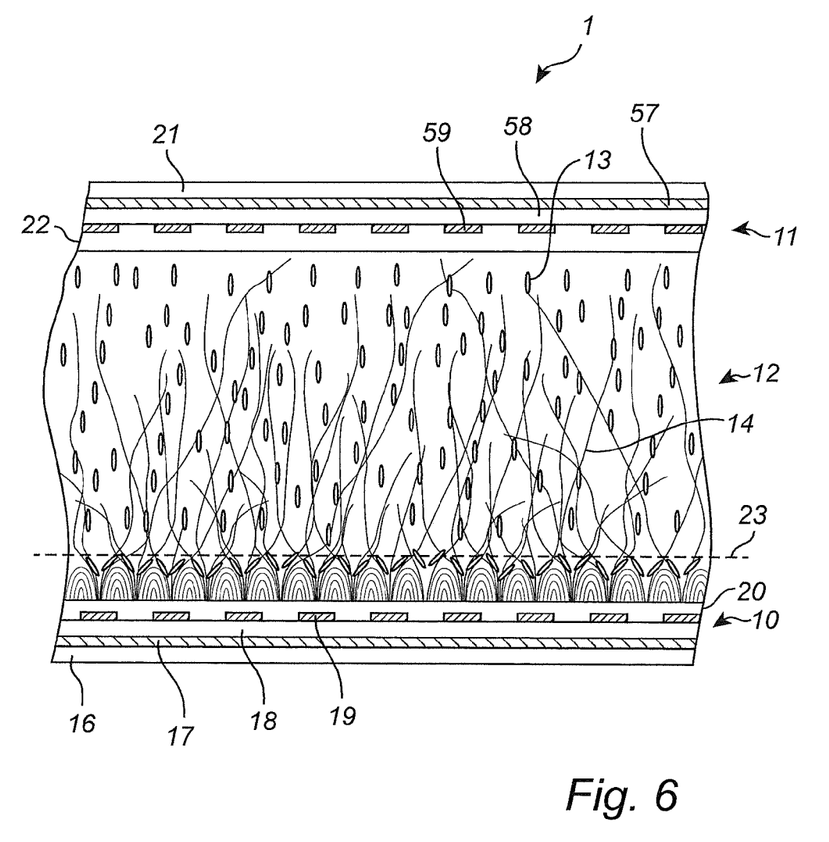
FIG. 6 is a cross-section view of an embodiment of a liquid crystal cell comprised in the liquid crystal device in FIG. 1.

As can be seen in FIG. 6, which is schematic cross-section view similar to that of FIG. 2, third and fourth individually controllable electrodes 57, 59 are arranged on the second substrate 11 and configured such that application of a voltage between third and fourth electrodes 57, 59 results in an electric field inside liquid crystal layer 11, the electric field alternatingly being substantially vertical to second substrate 11 and substantially parallel to second substrate 11 along a line parallel with second substrate 11. An insulating layer 58 is arranged to separate third electrode and fourth electrodes 57, 59.

What is claimed is:

1. A liquid crystal device comprising:
   a first substrate and a second substrate;
   a liquid crystal layer sandwiched between the first substrate and the second substrate, the liquid crystal layer comprising a nematic liquid crystal material;
   wherein said device being switchable, by the application of a control field, between an OFF state in which molecules of said nematic liquid crystal material are substantially vertically aligned relative to said substrates and an ON state in which said control field couples with said molecules to cause said molecules to reorient;
   said first substrate comprising first and second individually controllable electrodes arranged and configured such that application of a voltage between said first and second electrodes results in an electric field inside the liquid crystal layer,
   said electric field alternatingly being substantially vertical to the first substrate and substantially parallel to the first substrate along a line parallel with the first substrate;
   wherein the liquid crystal layer further comprises a stabilized polymer network;
   said stabilized polymer network being anchored to said first substrate and formed within a sub-region of the liquid crystal layer close to the first substrate, and said stabilized polymer network being configured to alternatingly induce splay deformation and bend deformation of the nematic liquid crystal material in said sub-region along a line parallel with the first substrate,
   wherein said induced splay deformation and bend deformation of the nematic liquid crystal material in said sub-region is arranged to provide a flexoelectric polarization in the nematic liquid crystal material, said flexoelectric polarization being perpendicular to the first substrate,
   wherein, due to the presence of said stabilized polymer network within said sub-region, both said splay and bend deformation of the liquid crystal material in said sub-region as well as said flexoelectric polarization resulting from said deformation being preserved in said OFF state as well as in said ON state of the device.

2. The liquid crystal device according to claim 1, wherein said first and second individually controllable electrodes are arranged in a layered configuration on said first substrate with an insulating layer arranged between said first and second individually controllable electrodes, said insulating layer being arranged to prevent an electrically conductive connection between said first and second individually controllable electrodes, and being arranged to physically separate said first and second individually controllable electrodes in a direction perpendicular to said first substrate.

3. The liquid crystal device according to claim 2, wherein said second individually controllable electrode is arranged between said first individually controllable electrode and said liquid crystal layer, said second individually controllable electrode being arranged to alternatingly shield and expose said first individually controllable electrode.

4. The liquid crystal device according to claim 1, wherein said first and second individually controllable electrodes are arranged in the same plane.

5. The liquid crystal device according to claim 1, wherein said polymer network is configured to alternatingly induce said splay deformation and said bend deformation of the nematic liquid crystal material only within 1 μm from a surface of said first substrate facing said liquid crystal layer.

6. The liquid crystal device according to claim 1, wherein said first substrate comprises an alignment layer facing said liquid crystal layer, said alignment layer promoting a substantially homeotropic alignment.

7. The liquid crystal device according to claim 1, wherein said second substrate comprises an alignment layer facing said liquid crystal layer, said alignment layer promoting a substantially homeotropic alignment.

8. The liquid crystal device according to claim 1, wherein said nematic liquid crystal material has such flexoelectric coefficients that said splay deformation of the nematic liquid crystal material results in a first flexoelectric polarization component perpendicular to said first substrate and said bend deformation of the nematic liquid crystal material results in a second flexoelectric polarization component having the same direction as said first flexoelectric polarization component.

9. The liquid crystal device according to claim 1, comprising a polymer network anchored to said second substrate and being configured to alternatingly induce splay deformation and bend deformation of the nematic liquid crystal material along a line parallel with the second substrate.

10. The liquid crystal device according to claim 1, further comprising:

third and fourth individually controllable electrodes arranged on said second substrate and configured such that application of a voltage between said third and fourth electrodes results in an electric field inside said liquid crystal layer, said electric field alternatingly being substantially vertical to the second substrate and substantially parallel to the second substrate along a line parallel with the second substrate.

* * * * *